(12) United States Patent
Ragusa et al.

(10) Patent No.: US 8,806,381 B2
(45) Date of Patent: Aug. 12, 2014

(54) METHOD AND SYSTEM TO IMPROVE GUI USE EFFICIENCY

(75) Inventors: Roberto Ragusa, Lucera (IT); Ciro Ragusa, Lucera (IT)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 12/870,982

(22) Filed: Aug. 30, 2010

(65) Prior Publication Data

US 2011/0119636 A1 May 19, 2011

(30) Foreign Application Priority Data

Nov. 18, 2009 (EP) ..................................... 09176281

(51) Int. Cl.
*G06F 3/0481* (2013.01)
(52) U.S. Cl.
USPC ............................. 715/856; 715/857; 715/862
(58) Field of Classification Search
USPC .......................................... 715/856, 857, 862
See application file for complete search history.

(56) References Cited

U.S. PATENT DOCUMENTS

| | | | | |
|---|---|---|---|---|
| 5,825,308 A | * | 10/1998 | Rosenberg | 341/20 |
| 5,929,840 A | * | 7/1999 | Brewer et al. | 715/862 |
| 6,005,573 A | | 12/1999 | Beyda et al. | |
| 6,137,472 A | * | 10/2000 | Pekelney et al. | 715/858 |
| 6,295,049 B1 | * | 9/2001 | Minner | 715/856 |
| 6,466,199 B2 | * | 10/2002 | Takase et al. | 345/159 |
| 6,654,035 B1 | * | 11/2003 | DeStefano | 715/798 |
| 6,664,989 B1 | * | 12/2003 | Snyder et al. | 715/856 |
| 6,867,790 B1 | * | 3/2005 | Brooks | 715/856 |
| 7,404,149 B2 | * | 7/2008 | Fox et al. | 715/810 |
| 8,130,194 B1 | * | 3/2012 | Fairs et al. | 345/157 |
| 2002/0030664 A1 | * | 3/2002 | Schena et al. | 345/163 |
| 2004/0189714 A1 | * | 9/2004 | Fox et al. | 345/810 |
| 2008/0007571 A1 | * | 1/2008 | Lee et al. | 345/678 |
| 2008/0222523 A1 | * | 9/2008 | Fox et al. | 715/701 |
| 2008/0256493 A1 | * | 10/2008 | Trewin | 715/858 |
| 2009/0193357 A1 | | 7/2009 | Panico et al. | |
| 2009/0235207 A1 | * | 9/2009 | Choi | 715/851 |

* cited by examiner

*Primary Examiner* — Ryan Pitaro
(74) *Attorney, Agent, or Firm* — Andrea Bauer; Hoffman Warnick LLC (57) ABSTRACT

A method and system to facilitate manipulation of the pointer on a screen displaying application windows when the applications use logical barriers to block the movement of the pointer in a window area. The GUI computes new pointer coordinates on the screen of an application window. In the case where the pointing device movement requires a crossing of a logical barrier implemented by the application, if the pointing device is in 'flying mode' the GUI of the invention authorizes the pointer to directly cross the barrier. If the pointing device is in 'crawling mode' the GUI does not authorize the barrier to be crossed and the pointer is blocked by the barrier.

20 Claims, 9 Drawing Sheets

METHOD AND SYSTEM TO IMPROVE GUI USE EFFICIENCY

FIELD OF THE INVENTION

The present invention generally relates to Graphical User Interfaces (GUIs) and, more particularly, the invention aims at improving the manipulation of the pointer on a display used by user applications based on GUIs.

RELATED ART

GUIs often present many buttons or other active elements. The interaction with these elements is typically obtained by providing on the screen a pointer whose movement is controlled by the user through a mouse-like device. On very crowded or complex GUIs, the interaction requires pointing accuracy and precision, leading to low productivity. According to the "Fitt's law" used in ergonomics, the time needed to rapidly move a pointer onto a target is a function of the distance to the target and the size of the target. The time is proportional to log2(D/W+1), where D is the distance from the starting point to the center of the target and W is the width of the target. This law proves that the time needed is higher when the starting point is far from the target and, even more important, the time is higher when the target is small; this is not surprising as a small target implies a lower pointing tolerance.

In some existing GUI design the edges of the screen can be thought as targets with infinite dimension, because the pointer is stopped when reaching them. This implementation exists for top-screen menu or corner window close button. As a consequence, for the user no precision in the manipulation of the pointer is required. Also, the US application US200810007571 discloses creating a "logical barrier" between two regions in a GUI which, in response to a user input directed towards a graphical element, prevents movement from a graphical element in the first predetermined region to a graphical element in the second predetermined region in response to a user input directed towards the graphical element in the second predetermined region. The use of barriers for manipulation helps in accelerating the movement. The logical barrier stops motion temporarily and the movement is freed after a specified amount of time after the motion has stopped (e.g., 2/10 of a second).

Consequently, if the logical barrier solution preventing motion temporarily is beneficial to devices with limited screen size such as Personal Digital Assistants (PDAs) and cell phones as cited in the prior art, there is a need for improving the manipulation of these logical barriers when there are a plurality of windows in the screen, the user having often the need of crossing the barriers. With a time limit on the movement of passing the barrier, even if a configurable and short duration of time (e.g., 4/10 second, 1/3 second, etc.) is chosen, the reaction time processed by the GUI is not immediate and the global movement on the screen is slowed down and near not practicable.

There is a need for a solution allowing the user to be blocked at barriers to accelerate the manipulation in a limited area and to be able to cross the barrier instantly when desired when the areas limited by barriers need to be crossed.

SUMMARY OF THE INVENTION

The present invention provides a method and system for accelerating the speed of user interaction when clicking GUI elements. More particularly, the present invention allows the instant passing of barriers positioned by the application developer to constrain the movement of the pointer to achieve easier correct positioning on possible click targets.

The present invention provides, on a computer, a graphical user interface which facilitates manipulation of a pointer on a screen displaying application windows, when the applications use logical barriers to block movement of the pointer in a window area. In an embodiment, the method comprises: receiving from a pointing device interface of a computer device driver an event advising of a movement of a pointing device corresponding to a delta movement of a pointer in a window of an application; computing delta coordinates of the pointer based on the movement of the pointing device; reading current coordinates of the pointer; reading a current pointing device mode; if there is a logical barrier in the application window to be crossed when applying the delta coordinates to the pointer: if the pointing device mode is in a crawling mode, reduce the delta coordinates of the pointer, in order to prevent the pointer from crossing the logical barrier and evaluate the new pointer coordinates by applying the reduced delta coordinates to the current coordinates of the pointer; and if the pointing device mode is a flying mode, evaluate the new pointer coordinates by applying the delta coordinates to the current coordinates of the pointer.

The present invention also provides a system for providing a graphical user interface of a computer to facilitate manipulation of a pointer on a screen displaying application windows when the applications use logical barriers to block the movement of the pointer in a window area. In an embodiment, the system comprises: a sensor, adapted to instantly capture a change of a binary position reflecting a pointing device flying/crawling mode change, the binary flying/crawling mode change being performed by a user manipulating a pointing device, and to transfer the pointing device mode change event to a pointing device interface of a computer; a dispatcher component for receiving the pointing device mode change event and any other pointing device event from the pointing device interface of the computer, the dispatcher component being adapted to dispatch the pointing device mode change event to a pointing device event change component and a pointing device movement event to a pointer coordinates evaluation component; the pointing device event change component being adapted for receiving the pointing device mode change event from the dispatcher and saving the new pointing device mode; the pointer coordinates evaluation component being adapted for receiving the pointing device movement event from the dispatcher component and evaluating the new coordinates of a pointer on a display controlled by an application executing on the computer taking into account saved current pointer coordinates, saved current pointing device mode, and widget layout data of the application including use of logical barriers; the pointer coordinates evaluation component being also adapted for: evaluating new pointer coordinates corresponding to the movement of the pointing device if there is no barrier implemented by the application or if there is a barrier and the pointing device mode is in flying mode; and, evaluating new pointer coordinates corresponding to a reduced movement of the pointing device so that the pointer is blocked by the barrier on the display and the pointing device is in crawling mode.

The solution of the present invention allows two modes of behavior for the user manipulation of a pointer: a crawling mode when the user applies a pressure on the mouse so that the pointer is blocked against a barrier, and a flying mode when the pressure on the mouse is released by the user, thus allowing the pointer to cross the logical barriers. The release of pressure immediately switches the constrained mode off.

With the solution of the present invention, the barriers are no more overridden by "forcing" the movement (that is, continuing the scrolling attempt) as with prior art solutions. The hardware modification of the mouse allows an instant release of the pressure, allowing the user to switch the barrier on/off instantly, such that the logical barriers in the application windows are smoothly passed.

The solution further include a modification to the mouse interface and protocol to support the new pressure information and a modification in the GUI to update the pointer coordinates in response to mouse input.

Finally, with the solution of the present invention, the movement of crossing the barriers in a complex application window or through multiple windows displayed on a screen when traveling from one window to the other, is particularly smooth without slowing the movement of the user.

An advantage of this solution is that the user is not obligated to use the constrained mode; if the user is not familiar with this new interfacing method or if a pressure sensitive mouse is not available, the GUI works exactly as without the invention.

As explained in the detailed description, the solution of the invention can include any pointing device and not only a mouse. Also, some pointing device gestures which do not change the architecture of the pointing device or any pointing device new feature (new button, knocking area) different from a pressure can be used in the solution of the invention. All the possible pointing device implementations generate a pointing device event understandable by the computer pointing device interface.

DETAILED DESCRIPTION OF THE INVENTION

Figure 1:
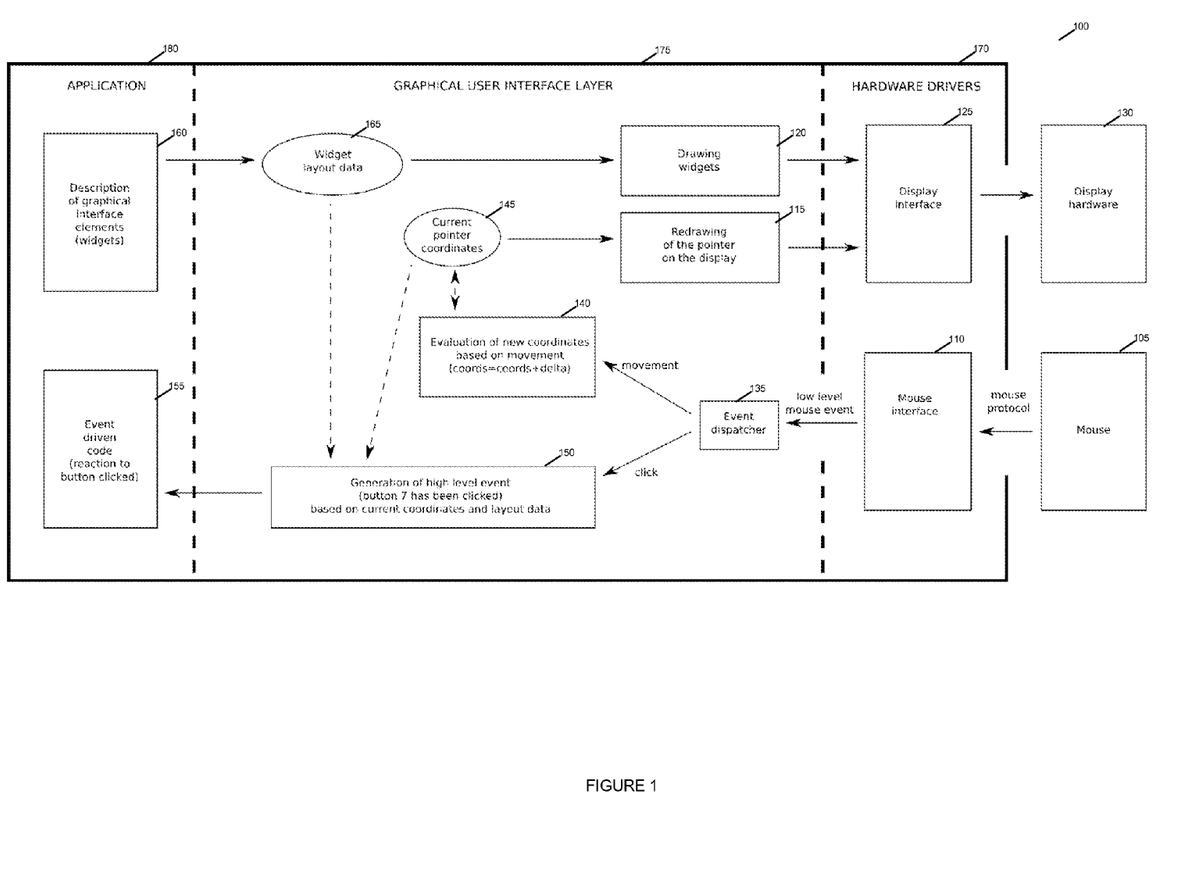
FIG. 1 shows the main components in a computer in which a GUI is used according to the prior art.

FIG. 1 shows the main components in a computer in which a GUI is used according to the prior art. In a computer (100), the user of an application (180) using a GUI (175) manipulates a mouse (105) with a certain protocol translated by a mouse interface (110) to the computer. By manipulating the mouse, the user can position a pointer on a display. The (GUI) is a computer component, generally a software layer on top of the operating system, able to receive the user mouse manipulation events from the mouse interface (110). A manipulation event is then dispatched (135) for further processing (140, 150) by the GUI and the new pointer position (115) is transferred to the display (130) through the display interface (125). The mouse manipulation can include, for example, a movement of the mouse or a click the user performs with the mouse on a target which is displayed on the screen by the application. The movement events generated by the mouse and transmitted with a suitable protocol to the mouse interface are finally used by the GUI to update the coordinates (140) of the pointer and redraw the display. In FIG. 1, the arrows in full line between components indicate a succession of tasks executed by the pointed components. The arrows in dotted lines indicate that the data at the origin of the arrow is used by the component pointed by the arrow to execute a task. In a similar way, click events are dispatched (135) and processed (150) by the GUI to decide if the current coordinates are associated with a clickable target; if this is the case, a high-level GUI event is passed to an application, which will execute the code associated with the button/widget/menu in the application corresponding to this visual target. Consequently, the GUI comprises a component able to dispatch (135) the different events which are of two types according to prior art: one type of event corresponding to a change of the coordinates of the pointer on the screen is processed by the GUI (140, 145, 115). The second type of event which is clicking of the pointer on one target on the screen, is partly processed by the GUI (150) and transferred to the application which recognizes (155) the event and generates a new display (160) on the screen. The GUI layout description (165) is used by the application to display (120, 125, 130) the corresponding graphical elements, i.e., widgets such as buttons/menu/windows. The GUI is able to generate the drawing of the corresponding graphical element upon request and parameters (165) sent by the application.

Figure 2:
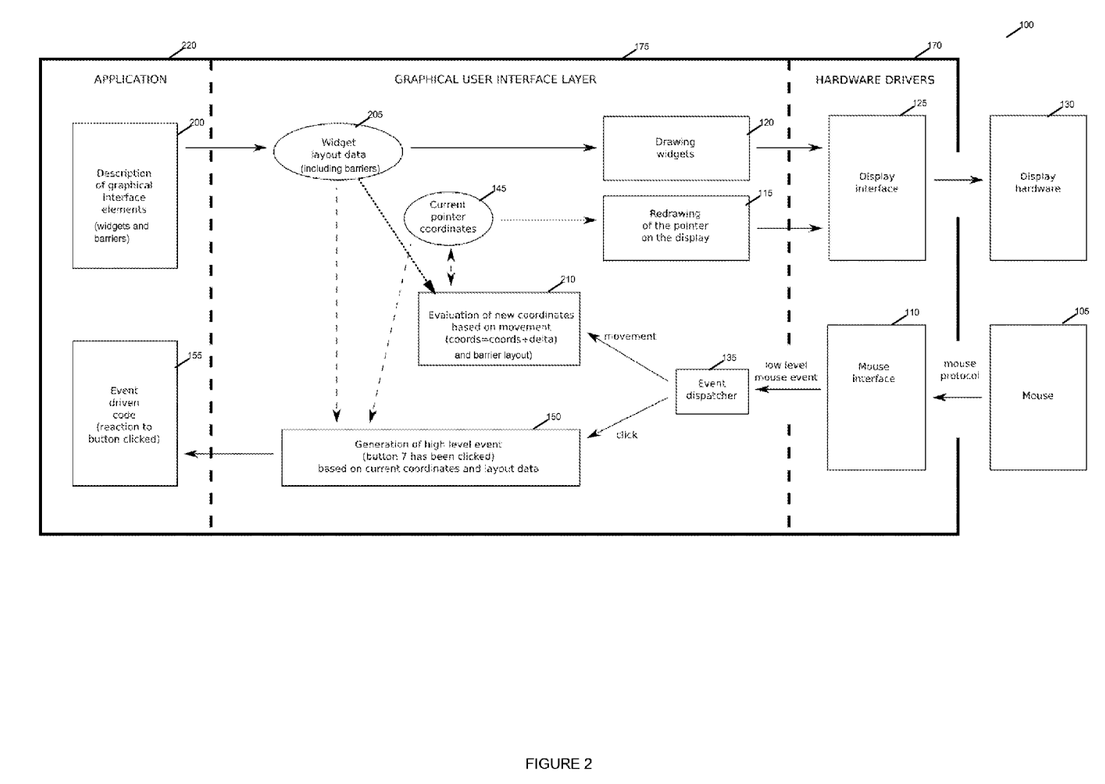
FIG. 2 shows the main components in a computer in which a GUI supporting logical barriers is used in an application according to prior art.

FIG. 2 shows the main components in a computer in which a GUI supporting logical barriers is used in an application according to the prior art. The components in FIG. 2 are mainly those of FIG. 1, but some of them with a new reference number have been modified to implement the support of logical barriers. Logical barriers are a new kind of GUI elements (205) and are part of the GUI design used by the application (200) developer. In the same way the application uses widget components in the GUI, the application is modified (220) to use the barrier GUI component. The GUI layer contains information about the barriers in addition to the usual information about widgets: buttons/menu/windows (205). In FIG. 2 the application indicates to the GUI that a barrier is used and provides parameters to qualify it. The GUI processes a barrier by modifying the coordinates of the pointer to block the pointer on the display during a period of time which is configurable by the user. To this extent, the GUI component which evaluates the new coordinates of the pointer according to a mouse movement, is adapted to modify (210) the coordinates of the pointer based on the barrier layout and for a configurable period of time (e.g., 4/10 second, 1/3 second etc.). When the time is passed with the pointer still in position to "force" the barrier, the GUI component authorizes the pointer to pass the barrier on the screen. In some of the following figures (FIG. 4, FIG. 5, FIG. 6) the logical barriers are represented for a clarification by dotted lines, however, the barriers could also be invisible, in this case the GUI component (120) drawing the other GUI components on the screen is not modified. All the components of the solution of the prior art are components implemented as program code instructions or with hardware coded instructions; as a consequence, the response time for crossing the barriers is well felt and undergone by the user.

Figure 3:
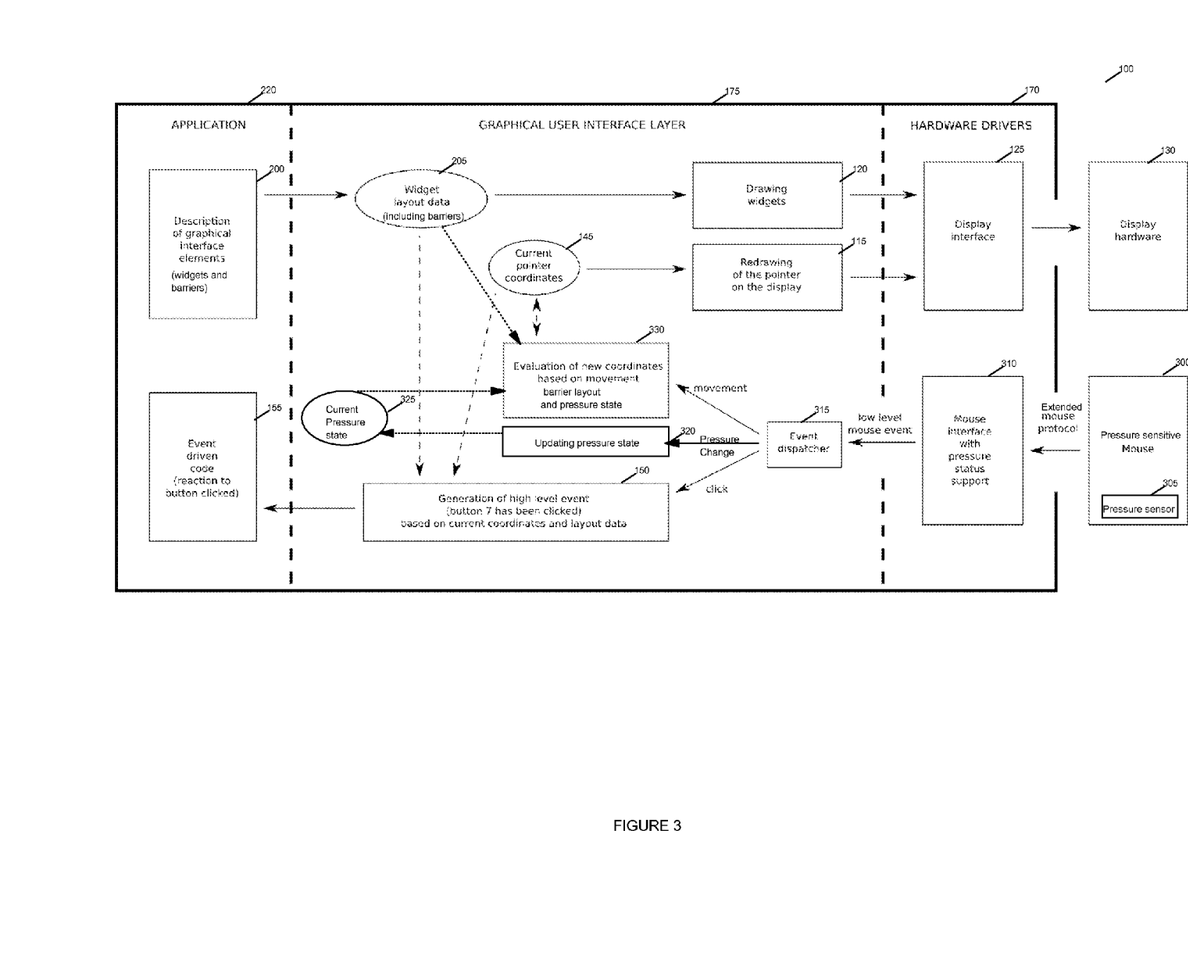
FIG. 3 shows the main components in a computer in which a GUI supporting logical barriers is used in an application according to an embodiment.

FIG. 3 shows the main components in a computer in which a GUI supporting logical barriers is used in an application according to an embodiment of the present invention. The mouse (300) now includes a new hardware feature, a pressure sensor (305); the mouse protocol is modified to include the ability to propagate the pressure information. The mouse interface (310) is extended to support the pressure information and the coordinate calculation component of the GUI (330) is modified to use this new input. In particular, the delta-movement (displacement) will be applied in reduced form (e.g., 2 pixels instead of 5 pixels) or totally discarded when the constrained mode (pressure present) is on and the movement would have passed through a barrier. When a pressure change event is now recognized and dispatched by the GUI Event dispatcher (315), it is sent to the GUI new component for updating the pressure state (320), the current pressure state being stored by this component (325). The GUI component evaluating the new pointer coordinates (330) is adapted to take into account the pressure state to evaluate the new coordinates of the pointer when a movement is detected. If a logical barrier is set and the mouse pressure released, the GUI component computes the new coordinates corresponding to the movement of the pointer over the barrier on the screen. Conversely, if a logical barrier is set and mouse pressure applied, the GUI component computes the new coordinates corresponding to the movement of the pointer blocked by the barrier on the screen. The application (220) including use of barriers has not been modified compared to the prior art of FIG. 2. The remaining GUI components (150, 205, 145, 120, 115) are unchanged compared to those of the prior art as illustrated in FIG. 2. The computer device driver to interface the display (125) and the display (130) remain unchanged compared to prior art.

Figure 4:
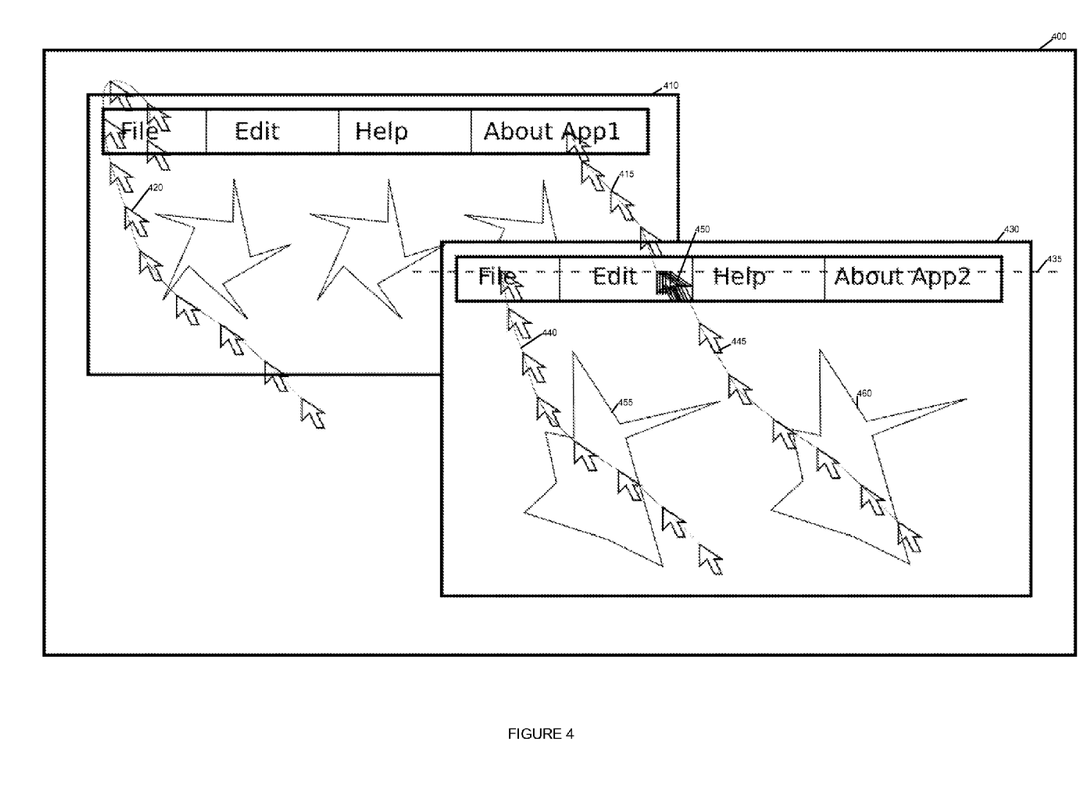
FIG. 4 shows the movement of the pointer on the screen when the user is blocked by a logical barrier in the window of the application according to prior art.

FIG. 4 shows the movement of the pointer on the screen when the user is blocked by a logical barrier in the window of the application according to the prior art. Two application windows are represented in the screen (400) of FIG. 4: App1 (410) and App2 (430) windows. The movement of the pointer is represented by blank filled wide arrows. In the App1 window (410), it is assumed that the user wants to click, for instance, a small target such as a menu entry. According to the representation of the movement of the pointer (415), the user will approach the target and then reduce the movement speed to achieve sufficient accuracy; alternatively (see movement 420), the target will be over passed and a successive correction action will be necessary before the clicking. In FIG. 4 the movement of the mouse shows a "successive approximation" pattern represented by the white filled arrows, which slows the user. In App2 window (430), a logical barrier is implemented. Assuming the user wants to click on File in the menu where a logical barrier (435) is implemented, according to a first movement (440), the user will approach the target and has no need to reduce the movement speed because he is blocked by the barrier in case he misses the File button. However, according to a second movement (445) illustrated in App2 window, in case the user wants to voluntarily cross the barrier to reach the App1 window for instance, he has to insist to force the barrier for a certain period of time. This is illustrated by an amount of arrows printed on the same place (450). Once again, even with the use of a barrier, the user is slowed when he wants to cross the barriers which may happen very often if the user goes forth and back from one window to the other one. Taking the example of App2 window (430), assuming logical barriers exist which trap the pointer in a geometrical figure such as the star like figures (455, 460). In the same way, if the user wants to cross the barriers represented by the figure borders to fly from the inside of the first figure (455) to the inside of the second figure (460), the same type of movement such as the movement to cross the barrier (445) will be performed by the pointer. This is a second example where the user will have to wait for a time for forcing the barrier before being able to fly from one figure to the other one; this happens very often when the application window is graphically complex.

Figure 5:
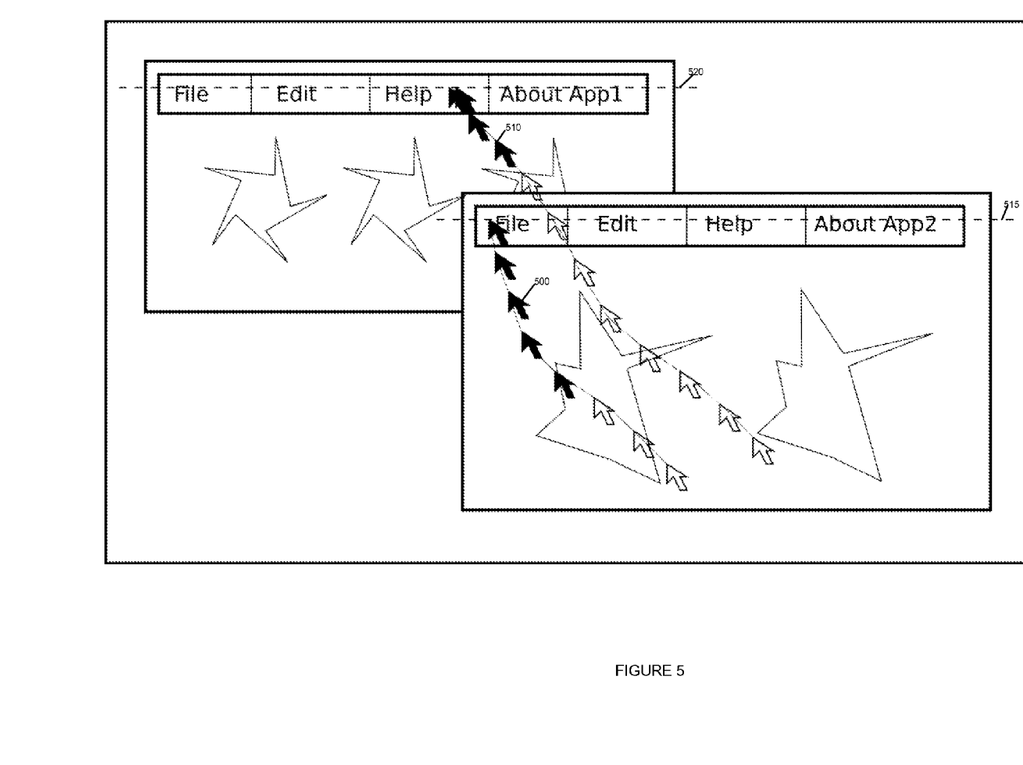
FIG. 5 shows the movement of the pointer on the screen when the user over passes a logical barrier according to the method of an embodiment.

FIG. 5 shows the movement of the pointer on the screen when the user over passes a logical barrier in the window of an application to reach another window of another application according to an embodiment of the present invention. In FIG. 5 the movement of the pointer on the screen corresponding to the movement of the mouse manipulated by the user is indicated with wide arrows. The arrows are black filled when the user applies a pressure on the mouse to indicate he wants to be blocked by a barrier (crawling mode) and the arrows are blank filled to illustrate a movement of the mouse by the user when he releases the pressure on the mouse to indicates he wants to pass a barrier (flying mode). In crawling mode the user can accelerate the movement to reach a target inside the area delimited by the barrier. In Flying mode the user wants to smoothly reach another area.

In FIG. 5 are shown two application windows in the screen of the computer. One first window is associated with the App2 application and the second window is associated with the App1 application. The user needs to navigate inside the window of App2 application and then to reach the window of App1 application. According to an embodiment of the present invention, in a first movement (500) illustrated in FIG. 5, the user begins to move the pointer with no application of pressure (white filled arrows) and switches to constrained mode (black filled arrows) when the target is near. In this case the pointer will be stopped by a barrier (515) strategically placed inside the clicking zone for the menu entries; the user has no difficulty in obtaining a correct y coordinate, because he is helped by the barrier; the x coordinate is not critical as the target is pretty wide along the x-axis. The second movement (510) shows how the user only activates the constrained mode after the crossing of the first barrier (515), as the next barrier he wants to be blocked by is the one (520) near the intended target.

Figure 6:
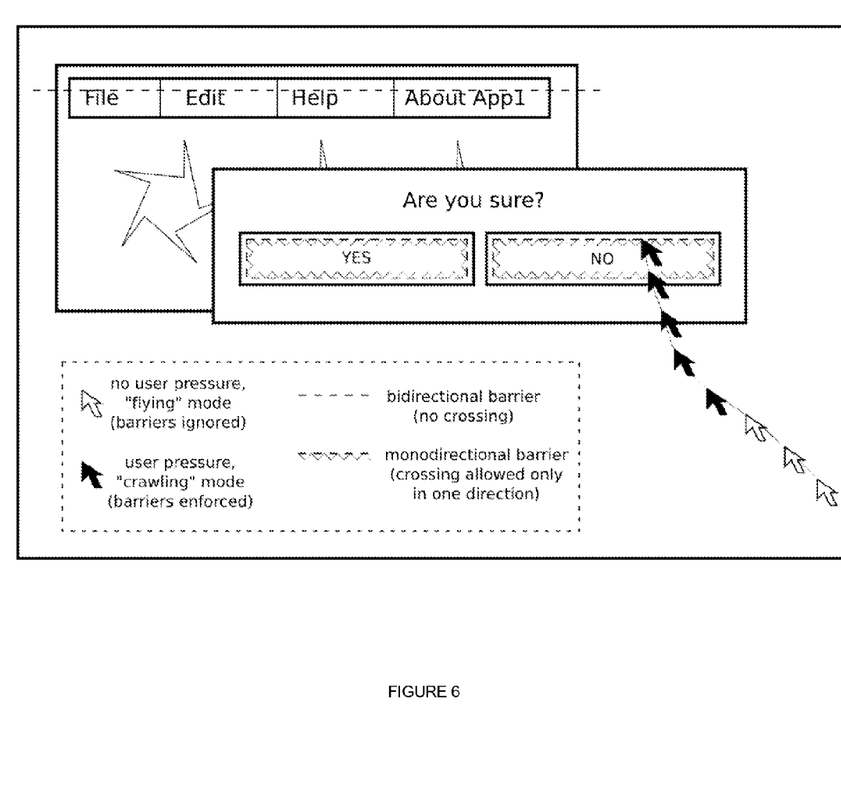
FIG. 6 illustrates how the mouse pressure feature is used with monodirectional and bidirectional barriers according to the method of an embodiment.

FIG. 6 illustrates how the mouse pressure feature is used with monodirectional and bidirectional barriers according to an embodiment of the present invention. Starting from the principle of a logical barrier of the prior art, this teaching can be extended to implement two types of barriers depending on the application. In a pop-up window used to get an answer from the user, the two buttons "yes" and "no" contain two areas delimited by two monodirectional barriers. Considering a barrier is represented by a line on the screen which can be crossed in two directions, monodirectional barriers prevent being crossed by the pointer in one direction and not the other one. Bidirectional barriers are the opposite, they cannot be crossed in any direction. In FIG. 6 monodirectional barriers are placed in such a way that they permit entering the internal area, but forbid exiting from it. The user approaches the desired button and applies pressure in the middle of the path; the pointer is not in the button area yet, but the first barrier is crossed because the direction is the allowed one; the second barrier is then encountered, but in this case the direction is the disallowed one, so the mouse pointer is stopped and the user can click the button immediately. In these kinds of configurations, monodirectional barriers act as "traps". The inversion of the allowed direction would create a "denied" zone (this case is not shown in the figure).

Using this type of logical barriers with the solution of the present invention, it is noted that the use of the mouse in "pressure on" does not change the entry of the pointer in the No 'trap': it is free because the barrier of the rectangle basis is monodirectional. So, if the user wants to quickly click on No, the mouse pressure (black-filled arrows) will be started before the entry of the pointer in the No 'trap' and maintained to allow the click.

Figure 7:
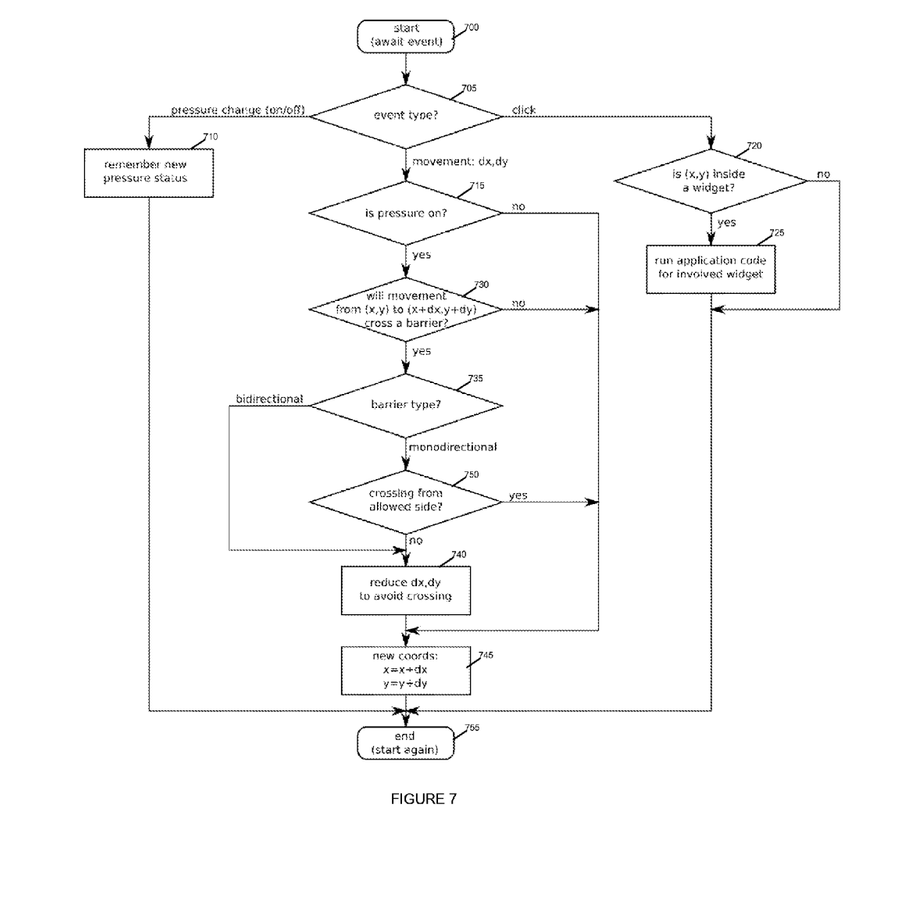
FIG. 7 is the flowchart of the method implemented in the GUI according to an embodiment.

FIG. 7 is the flowchart of the method implemented in the GUI according to an embodiment of the present invention. The steps of the method are described in relation with the GUI components as described in FIG. 3. The event dispatcher (315) waits (700) for any event from the mouse. When an event is received, it is analyzed by the dispatcher. If the event is a mouse pressure change (answer to test 705), the current pressure state is stored (710) by the GUI as indicated in FIG. 3. When a mouse movement event is detected (answer to test 705), the stored current pressure state is tested (715): if pressure is on (answer 'yes' to test 715), this means that the user wants to be blocked on the screen by the logical barriers. If the mouse movement event is for crossing a barrier, (answer 'yes' to test 730), this means that the movement could be blocked. It is noted that the step to check if the mouse movement event is for crossing a barrier (730) is performed by the GUI which reads the current pointer coordinates which it always stores at each evaluation of new coordinate. Going on in the flowchart, in an embodiment two types of barriers are considered, the bidirectional whose function is to block the pointer in any direction, and a monodirectional barrier whose function is to block the pointer only in one direction. This is with the assumption that the GUI is adapted to support applications using these two types of barriers.

In the case where the barrier is bidirectional (answer to test 735), the component of the GUI for evaluating the new pointer coordinates reading the barrier layout data provided by the application (205) blocks the pointer, that is from a coordinate perspective, if the movement of the pointer was dx, dy, this delta value is reduced (740) in order to maintain the pointer not beyond a barrier on the screen. The new coordinates are then computed (745) by the GUI component (330) which reads the current pointer coordinates (x, y) with lower dx, dy delta values, the result being x+dx, y+dy. Not represented in the flowchart, the GUI redraws the pointer on the screen (115) and transmits this information to the computer device driver display interface which interfaces the display. The last step ends (755) the flowchart and the process goes to the waiting mode step (700) for the GUI.

In the case where the barrier is monodirectional (answer to test 735), and that the request is to cross a side which is not authorized (answer 'no' to test 750), as with the preceding case, the component of the GUI for evaluating the new pointer coordinates blocks the pointer. The following steps are executed (740, 745) with reduced coordinates.

In the case where the barrier is monodirectional (answer to test 735), and that the request is to cross a side which is authorized (answer 'yes' to test 750), the new coordinates are computed (745) without reducing the dx, dy delta coordinates deducted from the movement event. The pointer will cross the barrier. The following step (745) of computing the new coordinates of the pointer according to the movement of the mouse is performed with unreduced coordinates. This is also the case when the movement of the pointer is not to cross a barrier (answer 'no' to test 730). So it is also the case when a movement of the mouse is detected (answer test 705) and that the stored current mouse pressure state indicates that the pressure on the mouse is not applied. In this case the user wants to pass over the logical barriers if any. In this case, the evaluation of the new coordinates of the pointer is directly computed (745) by the GUI without modifying the coordinates of the pointer from the movement indicated by the mouse. The step of reducing dx, dy to avoid crossing a barrier (740) is skipped.

The click of the mouse (answer to test 705) performed by the user who wants to designate a specific location on the screen is processed by the GUI of an embodiment as the GUI of prior art. The GUI does not compute new coordinates for the pointer on the screen but rather triggers the application on the basis of the current coordinates stored by the GUI by sending a high level event advising for the clicking and providing the current pointer coordinates. This part of the GUI is unchanged from prior art. This is not part of the invention which focuses to mouse manipulation event process. In the case where the current pointer coordinates are inside a widget on the screen, the GUI sends a high level event (not in the flowchart) to the application after triggering it (725) in relation with the widget and according to the widget layout data (205).

Figure 8:
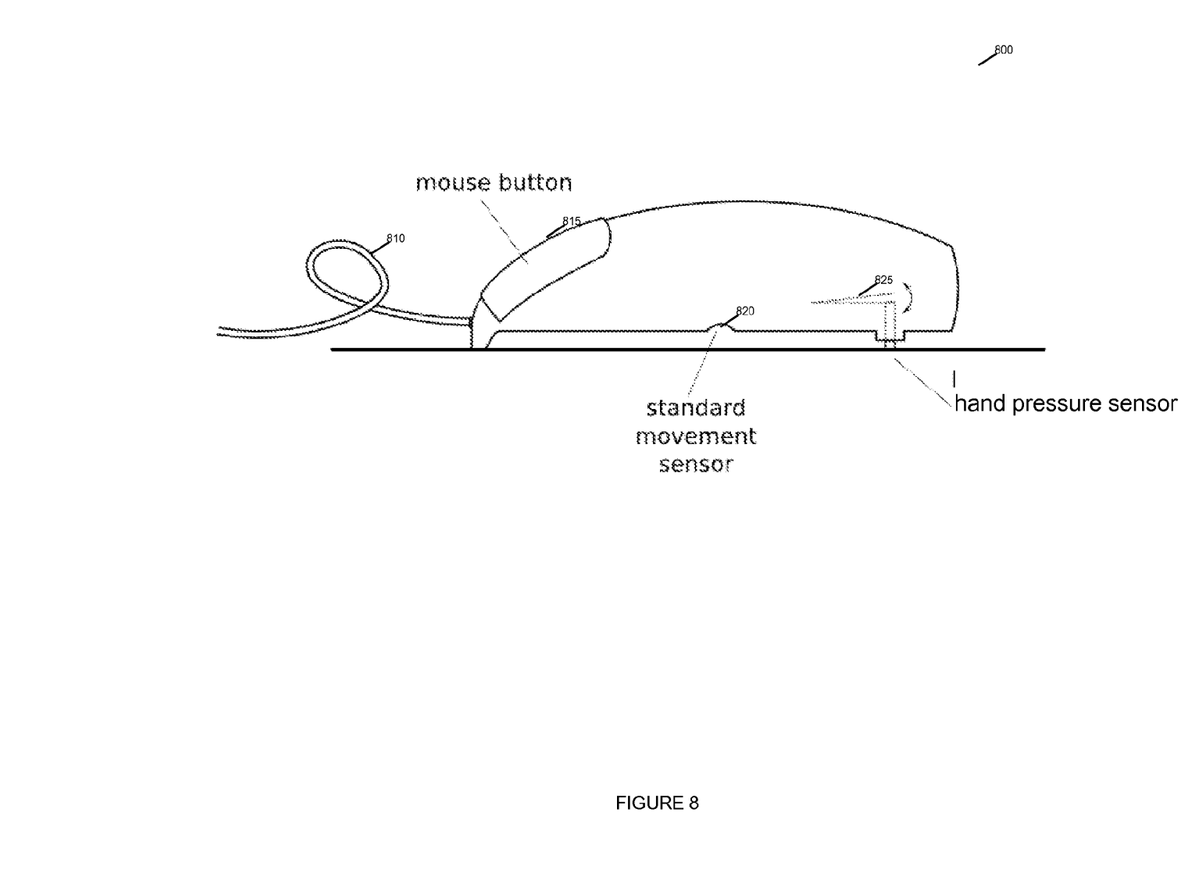
FIG. 8 illustrates a mouse related component of the solution of the invention according to an embodiment.

FIG. 8 illustrates a mouse related component of the solution of the invention according to an embodiment of the present invention. The mouse is, as usual, connected to the computer by a wire (810) or any existing other type of possible connection including wireless connection. The usual mouse button (815) is used to be clicked to designate a specific location of the pointer on the screen. The movement of the mouse applied by the user is detected by a sensor (820) which can be of any type. The new feature is a hand pressure sensor (825) able to detect a pressure applied by the user on the mouse. This pressure as well as the movement of the mouse are transmitted to the computer through the connection (810). In an embodiment the contact of the hand pressure sensor (825) is established when the mouse is pushed down.

It is noted that any other type of sensor capturing an instantly recognizable movement on the mouse different from the click on the mouse button exercised by the same hand of the user handling the mouse is valuable to operate the method of the invention. Pressure of the hand is one possibility but tapping on a specific area or pressing on a new mouse button of the mouse is possible also. One other possibility is to apply a specific mouse gesture which can be converted by a mouse event as in the case of mouse pressure. The interest with a specific mouse gesture is that the mouse architecture is not physically modified: only the connectivity for event creation is changed. The only obligation is to have a hardware and thus instant switching of on/off state which is binary. Many other variations are possible.

It is noted also that the most ergonomic choice has to be done when choosing the exact recognizable on or off movement. For instance, with the pressure sensor on the mouse it is intuitively more ergonomic for the user to apply a pressure on the mouse when he wants to be blocked by a logical barrier in order to reach quickly a target beneath it. And it is also intuitively more ergonomic for the user to release the pressure on the mouse when he wants to pass over a logical barrier in order to reach one other window or one other area in the same window. However, the opposite specific movement is an acceptable variation consisting in applying the pressure to pass over a barrier and releasing the pressure when wanting to be blocked by the barrier.

The person skilled in the art would adapt the other components of the solution of the invention to the different variations on the mouse (310) as mentioned here above.

Figure 9:
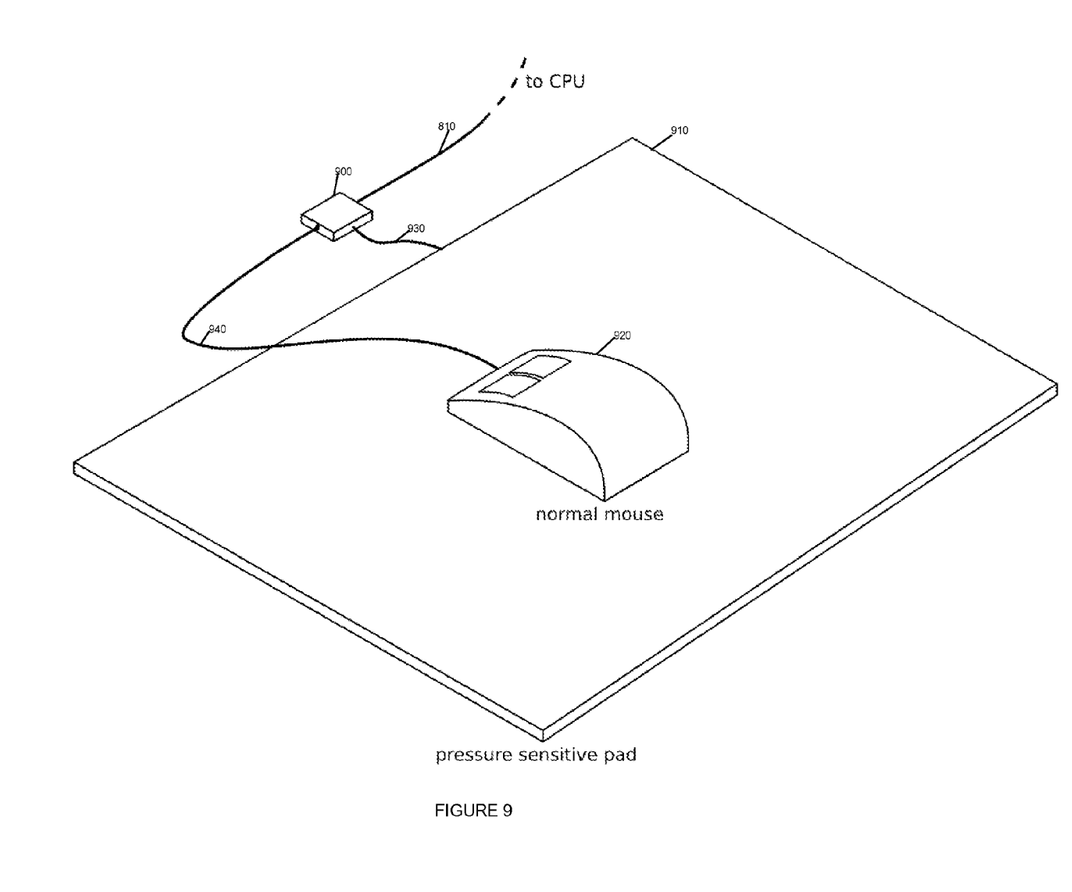
FIG. 9 illustrates a mouse related component of the solution of the invention according to an embodiment.

FIG. 9 illustrates a mouse related component of the solution of the invention according to another embodiment. In this embodiment, the mouse is not modified (920) but we have a mouse pad (910) which is pressure sensitive. The mouse cable is plugged into a "protocol extender" hardware feature (900) which integrates the information from the mouse (940) (movement and clicks) with the info from the pad (930) (pressure) and generates information (810) which appears (from the protocol point of view) to the CPU as if it was coming from the modified mouse of FIG. 8. A realistic implementation is to have this hardware feature inside the pad. The user in this case plugs the mouse into the pad and the pad into the CPU.

The invention can be also be applied to pointing devices different from a mouse. A pointing device (trackball, stylus, touch-based, etc.) able to generate a binary state (flying/crawling) in addition to the usual movement and click events is suitable to implement the invention. In this case the dispatcher event called "pressure mode" will not be strictly related to physical pressure (weight), but on other kinds of binary inputs (additional button, stylus twisting/squeezing, multi-finger touch, etc.).

A person skilled in the art can also adapt the invention to a 3D environment (immersive environments, augmented reality, virtual reality, 3D desktop, etc.). In a 2D environment, the guided areas are plane surfaces which becomes guided volumes in a 3D environment. Extending the logical barriers (monodirectional and bidirectional) to surface logical barriers, the invention can be implemented in a same pointing device with 3D capabilities.

The invention claimed is:

1. A method to provide on a computer a graphical user interface, which facilitates manipulation of a pointer on a screen displaying application windows, when the applications use logical barriers to block movement of the pointer in a window area, the method comprising:
   receiving from a pointing device interface of a computer device driver an event advising of a movement of the pointing device corresponding to a delta movement of a pointer in a window of an application;
   computing delta coordinates of the pointer based on the delta movement of the pointing device;
   reading current coordinates of the pointer;
   reading a current pointing device mode, wherein the current pointing device mode is a pressure between the pointing device and a surface under the pointing device;
   analyzing the current pointing device mode for determining if pressure is applied;
   if there is a logical barrier in an application window to be crossed when applying the delta coordinates to the pointer:
      if the pointing device mode is a crawling mode in which pressure is applied to the pointing device, reduce the delta coordinates of the pointer to prevent the pointer from crossing the logical barrier and evaluate new pointer coordinates by applying the reduced delta coordinates to the current coordinates of the pointer; and
      if the pointing device mode is a flying mode in which pressure is not applied to the pointing device, evaluate the new pointer coordinates by applying the delta coordinates to the current coordinates of the pointer.

2. The method of claim 1, further comprising:
saving the new pointer coordinates as the current pointer coordinates.

3. The method of claim 1, further comprising:
   receiving from the pointing device interface of the computer device driver an event advising of a new pointing device mode; and
   saving the new pointing device mode as a current pointing device mode.

4. The method of claim 1, further comprising:
   if there is no logical barrier in the application window to be crossed when applying the delta coordinates to the pointer, evaluate the new pointer coordinates by applying the delta coordinates to the current coordinates of the pointer.

5. The method of claim 1, wherein after testing if the pointing device mode is the crawling mode, the method further comprises:
   if the barrier is monodirectional and the crossing is from an allowed side, evaluate the new pointer coordinates by applying the delta coordinates to the current coordinates of the pointer.

6. The method of claim 1, further comprising,
   receiving from the pointing device interface of the computer device driver an event advising of a click on the pointing device; and,
   sending a high level event to the application advising of the current pointer coordinates and widget data layout data already saved for the application.

7. The method of claim 1, further comprising:
   redrawing the pointer on the screen displaying the application window and sending associated information to a display interface of the computer device driver for displaying the pointer on the screen.

8. The method of claim 1, further comprising:
   a user manipulating the computer pointing device so that the pointing device generates an event advising of a new pointing device mode to the pointing device interface of the computer.

9. The method of claim 1, wherein the new pointer coordinates are (x+dx, y+dy), and wherein the current coordinates are (x, y) and the delta movement is dx and dy.

10. A computer program product stored on a non-transitory computer readable storage medium for providing a graphical user interface, which facilitates manipulation of a pointer on a screen displaying application windows, when the applications use logical barriers to block movement of the pointer in a window area, when the program is executed on a computer, the program product comprising program code for:
   receiving from a pointing device interface of a computer device driver an event advising of a movement of the pointing device corresponding to a delta movement of a pointer in a window of an application;
   computing delta coordinates of the pointer based on the delta movement of the pointing device;
   reading current coordinates of the pointer;
   reading a current pointing device mode, wherein the current pointing device mode is a pressure between the pointing device and a surface under the pointing device;
   analyzing the current pointing device mode for determining if pressure is applied;
   if there is a logical barrier in an application window to be crossed when applying the delta coordinates to the pointer:
      if the pointing device mode is a crawling mode in which pressure is applied to the pointing device, reduce the delta coordinates of the pointer to prevent the pointer from crossing the logical barrier and evaluate new pointer coordinates by applying the reduced delta coordinates to the current coordinates of the pointer;

if the pointing device mode is a flying mode in which pressure is not applied to the pointing device, evaluate the new pointer coordinates by applying the delta coordinates to the current coordinates of the pointer.

11. The computer program product of claim 10, further comprising program code for:
saving the new pointer coordinates as the current pointer coordinates.

12. The computer program product of claim 10, further comprising program code for:
receiving from the pointing device interface of the computer device driver an event advising of a new pointing device mode; and
saving the new pointing device mode as a current pointing device mode.

13. The computer program product of claim 10, further comprising program code for:
if there is no logical barrier in the application window to be crossed when applying the delta coordinates to the pointer, evaluate the new pointer coordinates by applying the delta coordinates to the current coordinates of the pointer.

14. The computer program product of claim 10, wherein after testing if the pointing device mode is the crawling mode, further comprising program code for:
if the barrier is monodirectional and the crossing is from an allowed side, evaluate the new pointer coordinates by applying the delta coordinates to the current coordinates of the pointer.

15. The computer program product of claim 10, further comprising program code for:
receiving from the pointing device interface of the computer device driver an event advising of a click on the pointing device; and,
sending a high level event to the application advising of the current pointer coordinates and widget data layout data already saved for the application.

16. The computer program product of claim 10, further comprising program code for:
redrawing the pointer on the screen displaying the application window and sending associated information to a display interface of the computer device driver for displaying the pointer on the screen.

17. The computer program product of claim 10, wherein the new pointer coordinates are (x+dx, y+dy), and wherein the current coordinates are (x, y) and the delta movement is dx and dy.

18. A system for providing a graphical user interface, which facilitates manipulation of a pointer on a screen displaying application windows, when the applications use logical barriers to block movement of the pointer in a window area, comprising:
a pointing device;
a component configured to receive from a pointing device interface of a computer device driver an event advising of a movement of the pointing device corresponding to a delta movement of a pointer in a window of an application;
a component configured to compute delta coordinates of the pointer based on the delta movement of the pointing device;
a component configured to read current coordinates of the pointer; and
a component configured to read a current pointing device mode, wherein the current pointing device mode is a pressure between the pointing device and a surface under the pointing device;
a component configured to analyze the current pointing device mode to determine if pressure is applied;
wherein:
if there is a logical barrier in an application window to be crossed when applying the delta coordinates to the pointer:
if the pointing device mode is a crawling mode in which pressure is applied to the pointing device, the delta coordinates of the pointer are reduced to prevent the pointer from crossing the logical barrier and new pointer coordinates are evaluated by applying the reduced delta coordinates to the current coordinates of the pointer;
if the pointing device mode is a flying mode in which pressure is not applied to the pointing device, the new pointer coordinates are evaluated by applying the delta coordinates to the current coordinates of the pointer.

19. The system of claim 18, wherein the pointing device is a computer mouse.

20. The system of claim 18, wherein the new pointer coordinates are (x+dx, y+dy), and wherein the current coordinates are (x, y) and the delta movement is dx and dy.

* * * * *